May 16, 1939. J. F. MONTINE 2,158,475
RECORDING AND ILLUSTRATING DANCE STEPS
Filed Nov. 14, 1935 2 Sheets-Sheet 1

INVENTOR.
Joseph F. Montine.

May 16, 1939.                 J. F. MONTINE                    2,158,475
                    RECORDING AND ILLUSTRATING DANCE STEPS
                     Filed Nov. 14, 1935        2 Sheets-Sheet 2

INVENTOR.
Joseph F. Montine.

Patented May 16, 1939

2,158,475

UNITED STATES PATENT OFFICE 2,158,475

RECORDING AND ILLUSTRATING DANCE STEPS

Joseph F. Montine, Brooklyn, N. Y.

Application November 14, 1935, Serial No. 49,856
In Canada February 7, 1927

5 Claims. (Cl. 35—29)

This invention relates to a means for recording and displaying the movements of an exponent which has for its object providing students with analytic elements relating to an art, as practiced by leading artists. It relates more particularly to charts displaying position and direction of foot movement and is a continuation in part of application Serial No. 641,809 filed November 8, 1932, abandoned November 17, 1935, which is a continuation in part of application, Serial No. 96,251 filed March 20, 1926, abandoned November 16, 1932.

Different methods of graphic notations have proved insufficient and too primitive for a finely cultured art of the dance. The infallible way of representing the art is illustrating it personally—"dancing it"—that is, the creative dancer passes his work on bodily to others. When a ballet master desires to produce the composition of another, he must go where it is executed. And if he desires to reproduce one of his own that was produced a few years before, he has nearly the same difficulty as at the original production, for the dancers are not the same. He must show them every step, because it is impossible to supply them with written parts with which they can practice alone.

In illustrating dance movements in accordance with the present invention, the general plan and extent of the movements are displayed by means of a chart showing position and direction of foot movement. This chart, while incomplete and insufficient for the purpose of illustrating dance movements, serves as an accurate working pattern for use in conjunction with a method and means set forth in my copending application, Serial No. 128,810, filed March 3, 1937.

The invention forming the subject matter of this application is in the nature of a marker made from thin sheet material having apertures disposed substantially centrally which are adapted to co-operate with prearranged position marks upon a floor surface thereover for the purpose of positioning the marker to conform with the said marks, whereby position and direction of foot movement can be indicated to the user thereof.

An object of the invention is the provision of a means for accurately marking the position and direction of each step executed by an exponent upon a floor surface thereover, and provisions for indicating relationship between each step so marked and the particular feet of one or more exponents.

A further object of the invention is the provision of means whereby recording and displaying the movements of an exponent may be readily carried out, these means including markers for designating various positions and also devices for indicating the order in which the positions are taken.

A further object of the invention comprehends replotting the original plan of foot prints upon a floor surface thereover by means of markers for use as a working pattern in conjunction with the text as set forth in my copending application above identified.

Other objects and advantageous features more or less ancillary to the foregoing and the manner in which all the various objects are realized will appear in the following description, which, considered in conjunction with the accompanying drawings, sets forth the preferred form of the invention.

Figure 3:
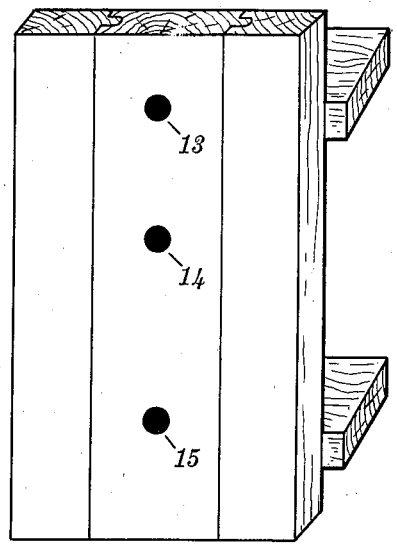
Figure 4:
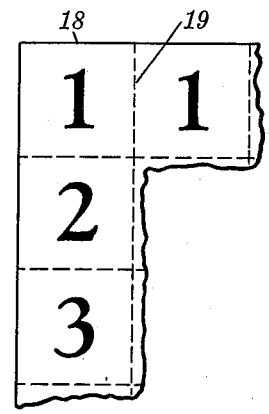
Figure 5:
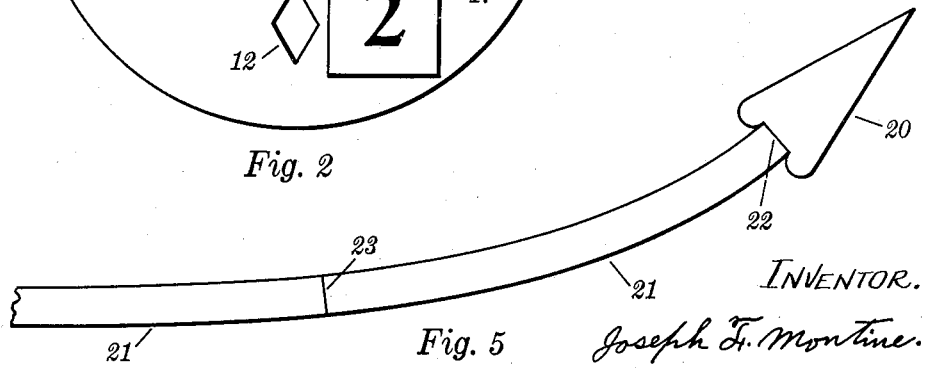
Figures 6, 7, 8:
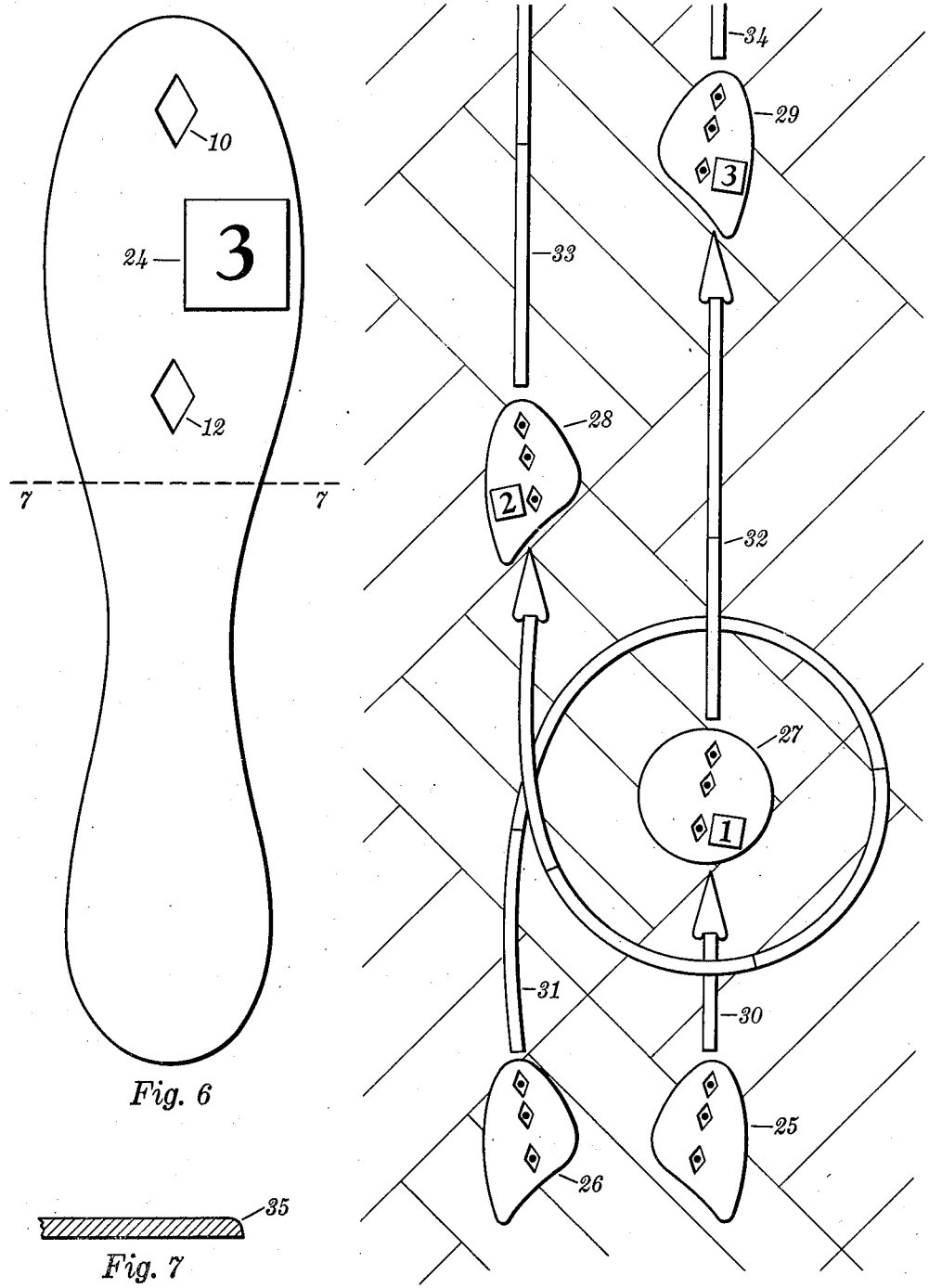

Figure 3 is a plan view of a section of a dance floor showing position marks imprinted thereon, as by a dance shoe disclosed in Patent No. 1,655,326 granted to me January 3, 1928, Figure 4 is a view of a supply card perforated to provide numeral bearing cards, Figure 5 is a plan view of die cut sheet material for use in constructing lines connecting markers positioned upon a floor surface thereover, Figure 6 is a plan view of a marker having the outline of a ballet slipper sole, Figure 7 is a fragmentary sectional view taken along the line 7—7 of Figure 6 and illustrated upon an enlarged scale, and Figure 8 is a view of a floor surface having prearranged position marks imprinted thereon with markers positioned in accordance therewith.

In recording and illustrating dance movements, the first consideration is to set a standard of skill for one or more given dances, and to have the movements executed by one or more exponents. To record the steps of a given dance upon a floor surface thereover, special shoes are provided, these shoes being equipped with special features on their soles, whereby every step taken leaves an impression on the floor surface. Such a shoe is disclosed in my Patent No. 1,655,326, above mentioned. These impressions incident to the steps are composed of a series of position marks or dots representative of the exponent's toe. As is shown in Figure 3, the toe impressions are indicated by three dots in a row; and the point of the toe—or its direction—is indicated by grouping the medial dot with the forward one.

These dots serve as position marks for use in positioning the markers in accordance therewith in recording position and direction of foot movement upon a floor surface thereover. The plurality of separately spaced marking devices with which these special shoes are provided, when brought in contact with the floor surface, will leave imprints in a variety of colors. In this connection it is pointed out that a particular color is used in connection with each shoe in recording position and direction of foot movement upon a floor surface thereover. For example, black position marks may represent the lady's right foot, and green her left foot; while red position marks may represent the gentleman's right foot, and blue his left foot. The various colors enable one to readily distinguish between the position marks imprinted by the different feet in mounting each series of marks with a proper marker to indicate position and direction of foot movement as executed by one or more exponents.

Figure 1:
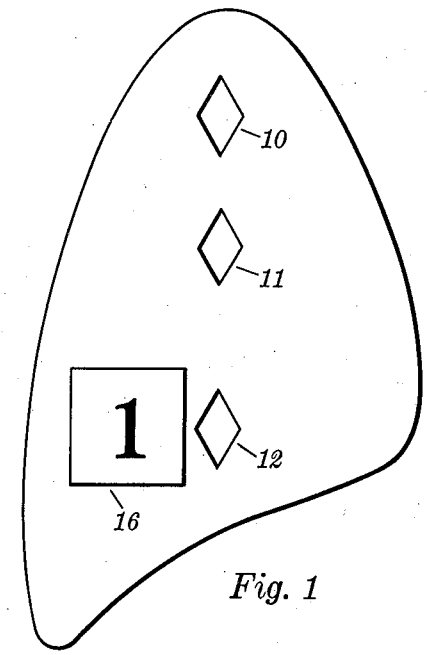
Figure 1 is a plan view of a marker having the outline of a half sole.
Figure 2:
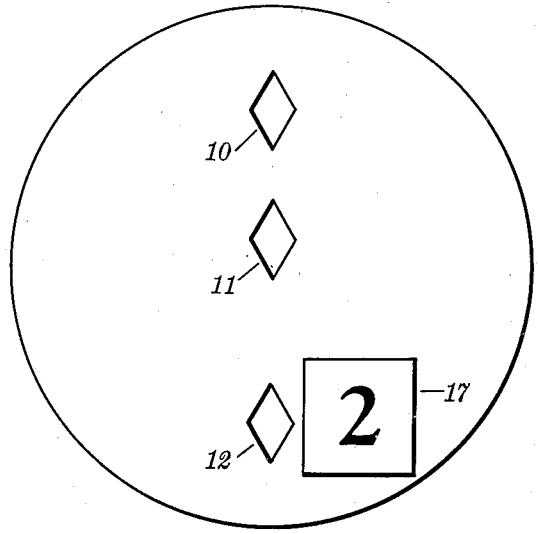
Figure 2 is a plan view of a marker having a circular outline.

In reference to Figures 1, 2 and 6, markers similar to the marker illustrated in Figure 1 indicate right or left position by means of their peculiar outline, the outline edge of the marker being considerably longer than its inside edge. The characteristics of the marker illustrated in Figure 2 in this respect is similar to the marker shown in Figure 1. The outline of the marker illustrated in Figure 6 has no distinguishing features in respect to right and left positions. Since the numeral card is positioned near the outside edge on each marker, the position of the numeral card, which may be of a color that differs from the color of the marker, is sufficient to indicate whether a marker of this type represents right or left position.

In order to indicate the steps, the positions of which are marked upon a floor surface by means of position marks, I make use of a series of markers like the marker shown in Figure 1. These markers are made from thin sheet material in sets of contrasting colors having the outline of a half sole for indicating steps. Where a step combines with a pivot the marker shown in Figure 2 having a circular outline is employed. The numbers indicating the numerical order of the steps are positioned a convenient distance back from the point and near the outside edge on each marker. Each marker has a plurality of openings or perforations, corresponding in relative positions to the marks made by the special shoe. As shown in the drawings these may consist of three diamond shaped figures in longitudinal arrangement and forming sight opening to aid in properly positioning the markers on the floor, although it is evident that other shapes and arrangements may be used without departing from the scope of my invention; the purpose being to provide means for identifying and indicating foot positions. These markers are attached to the floor surface by suitable means such as a rubber adhesive. The object of using markers in contrasting colors is to enable them to represent different persons who take part in a dance, and therefore to make the course taken by each person easily apparent since each will be allotted a color.

In reference to Figures 1, 2, 3 and 6 of the drawings, the apertures 10, 11 and 12 correspond as to position and spacing with the marking devices of the special shoes referred to in a manner that will permit the markers, when properly positioned in accordance with the position marks 13, 14 and 15 imprinted by the shoe, to indicate the exact position and direction of a step as it was executed by an exponent and recorded by means of the said position marks upon a floor surface thereover. In properly positioning the markers illustrated in Figures 1, 2 and 6 upon a floor surface thereover in accordance with the position marks, the apertures are centered with the position marks as is shown in Figure 8 leaving the position marks exposed to view for use in correctly positioning the markers in accordance therewith, for use in inspecting and checking the position marks for possible error in mounting each series of position marks with a proper marker properly positioned, and for use in conjunction with a method and means set forth in my copending application, Serial No. 128,810, filed March 3, 1937. These markers are preferably made from solid color rag stock, and are cut and formed with a special die which draws down and compresses the upper side of its edges to a rounded or beveled form as is shown at 35 in Figure 7 for the purpose of reducing the thickness of the cut edges thereby preventing chipping and wear on the marker edges especially when the cheaper grades of cardboard are employed in their manufacture. With their edges reduced in the manner described, the markers may be made from heavier material having sufficient strength and thickness to permit their being held in position by attaching their edges to the floor surface, and will be prevented from working loose and being detached from the floor. With their rounded or beveled edges which are securely attached to the floor and their smooth hard surface, these markers do not alter the surface of a dance floor to any perceptible extent and are not easily dislodged by dancing, sliding, or pivoting feet of dancers.

In the drawings, wherein for the purpose of illustration is shown a preferred embodiment of the invention, Figure 8 designates a floor surface over which an exponent has executed a dance movement wearing the special shoes referred to thereby recording position and direction of foot movement thereover by means of position marks, which in turn are mounted with the markers referred to. The exponent's initial position is at the bottom of the page and facing the general direction of the dance which is upwards. The first step is forward with the right foot from the marker 25 along the line-of-movement 30 to the marker 27. The next step is forward with the left foot from the marker 26 along the line-of-movement 31 to the marker 28. During the course of this movement the exponent pivots one complete turn in the direction towards the right as indicated by the line-of-movement 31. The marker 27 has a circular outline to indicate that this step combines with a pivot. The next step is forward with the right foot from the marker 27 along the line-of-movement 32 to the marker 29. The next step is forward with the left foot from the marker 28 to the next position, etc. The markers 25 and 26 representing the starting point are without numbers. The balance of the steps are provided with reference numbers.

Markers indicating full sole positions are impracticable for ballroom use in displaying the steps of a couple due to the close formation of dance steps and overlapping of the markers. Markers indicating full sole positions may be employed in illustrating ballet technique when the steps are few and spaced well apart. The marker shown in Figure 6 corresponds with the sole of a ballet slipper in outline and represents the preferred form for use in charting full sole positions.

For the purpose of identifying the different steps in connection with a dance, the markers are numbered. To this end I provide a supply card like the card shown in Figure 4. This card is made from thin sheet material having an adhesive back, and is perforated at 19 to provide cards 18 which are torn from the supply card along the perforated lines. These numeral cards are attached to the markers at the time of their use either before or after the markers are positioned upon a floor surface. This practice avoids the necessity of carrying a large assortment of markers and searching for a particular marker for each particular step in numerical order in charting various dances.

After the position marks have been mounted with markers and the markers numbered, the lines of movement between positions are formed by means of strips and arrows like the illustrations in Figures 5 and 8 of the drawings. The lines are first marked out on the floor surface by means of an adjustable curve ruler and chalk to conform closely with normal movements. The strips and arrows are positioned alongside the marked lines and adhesively attached to the floor surface.

In connection with ballroom floors, these markers as variously arranged provide a working pattern for use in tracing movements thereover during intervals between dances. During intervals of dancing it is obvious that the markers may not be made use of, and that the floor must be available for use in dancing thereover with the markers remaining in position for use during following intermissions between intervals of dancing. Employed in connection with dance floors, floor diagrams as set forth serve as accurate working patterns for use in practicing steps thereover, and in acquiring positions that are essential to brilliant execution. No matter how vividly the display of movements may be, no form of illustration will take the place of an accurate working pattern in the form of a floor diagram. Completely eliminating mental calculation and guesswork, it provides the student with a definite plan of procedure in connection with the text as set forth in my copending application, Serial No. 128,810, filed March 3, 1937.

For the purpose of illustrating my invention, I have shown in the accompanying drawings forms thereof which are at present preferred, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Having particularly described and ascertained the principle of my said invention and in what manner the same is to be performed, I declare that what I claim is:

1. For use on a floor surface in teaching bodily movements thereover, a marker made of thin sheet material having a plurality of apertures therein for aiding in the proper location of the marker on the floor to indicate foot position, as and for the purpose described.

2. For use on a floor surface in teaching bodily movements thereover, a marker made of thin sheet material having at least three apertures therein unequally spaced from one another for aiding in correctly locating the marker on the floor to indicate position and direction of foot movement to the user thereof.

3. For use on a floor surface in teaching bodily movements thereover, a marker made of thin sheet material having at least three aligned apertures unequally spaced from one another whereby position and direction of foot movement can be indicated to the user thereof.

4. For use on a floor surface in teaching bodily movements thereover, a marker made of thin sheet material having a plurality of apertures therein for aiding in the proper location of the marker on the floor to indicate foot position, said marker simulating the shape of a shoe half sole.

5. For use on a floor surface in teaching bodily movements thereover, a marker made of thin sheet material having a plurality of apertures therein for aiding in the proper location of the marker on the floor to indicate foot position, said marker being circular in outline.

JOSEPH F. MONTINE.